United States Patent
Cho et al.

(10) Patent No.: US 10,235,120 B2
(45) Date of Patent: Mar. 19, 2019

(54) DISPLAY APPARATUS, DISPLAY SYSTEM, AND CONTROLLING METHOD THEREOF

(71) Applicant: SAMSUNG ELECTRONICS CO., LTD., Suwon-si (KR)

(72) Inventors: Seong-phil Cho, Seoul (KR); Tae-je Park, Suwon-si (KR); Ho-seop Lee, Seongnam-si (KR); Byeong-cheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 105 days.

(21) Appl. No.: 14/811,975

(22) Filed: Jul. 29, 2015

(65) Prior Publication Data

US 2016/0034242 A1 Feb. 4, 2016

Related U.S. Application Data

(60) Provisional application No. 62/032,747, filed on Aug. 4, 2014.

(30) Foreign Application Priority Data

Feb. 2, 2015 (KR) .................. 10-2015-0016149

(51) Int. Cl.
*G06F 3/14* (2006.01)

(52) U.S. Cl.
CPC .......... *G06F 3/1446* (2013.01); *G06F 3/1431* (2013.01); *G09G 2356/00* (2013.01); *G09G 2370/042* (2013.01)

(58) Field of Classification Search
CPC .. G09G 2356/00; G06F 3/1431; G06F 3/1446

USPC .................................................. 345/1.1–1.3
See application file for complete search history.

(56) References Cited

U.S. PATENT DOCUMENTS

| | | | |
|---|---|---|---|
| 7,777,691 B1 * | 8/2010 | Nimmer | G06F 3/1446 345/1.2 |
| 2011/0122048 A1 | 5/2011 | Choi et al. | |
| 2012/0050135 A1 * | 3/2012 | Glen | G06F 3/1446 345/1.1 |
| 2012/0062475 A1 * | 3/2012 | Locker | G06F 3/041 345/173 |
| 2014/0104139 A1 * | 4/2014 | Buchner | G06F 3/1438 345/1.3 |
| 2015/0002371 A1 * | 1/2015 | Burgess | G09G 5/12 345/1.2 |

(Continued)

FOREIGN PATENT DOCUMENTS

| | | |
|---|---|---|
| KR | 10-2011-0058049 A | 6/2011 |
| KR | 10-2014-0067343 A | 6/2014 |

*Primary Examiner* — Amr A Awad
*Assistant Examiner* — Stephen A Bray
(74) *Attorney, Agent, or Firm* — Sughrue Mion, PLLC

(57) ABSTRACT

A display apparatus constituting a video wall system is provided. The display apparatus includes a display, a first communicator configured to perform communication with at least one adjacent display apparatus, and a processor configured to allocate identification information corresponding to the display apparatus based on identification information received from the adjacent display apparatus and information on a location relationship of the display device relative to the adjacent display apparatus and display a sub-image of an image through the display based on the allocated identification information.

11 Claims, 12 Drawing Sheets

(56) References Cited

U.S. PATENT DOCUMENTS

| | | | | |
|---|---|---|---|---|
| 2015/0077310 A1* | 3/2015 | Inamoto | ................ | G06F 3/1446 345/1.3 |
| 2015/0268918 A1* | 9/2015 | Fu | ........................ | G06F 3/1446 345/661 |
| 2015/0301781 A1* | 10/2015 | Ekkaia | .................. | G06F 3/1446 362/237 |

* cited by examiner

| Bit | 6 | 5 | 4 | 3 | 2 | 1 | 0 |
|---|---|---|---|---|---|---|---|
| Slave Addr | ROW ||| COLUMN ||||

510   520

DISPLAY APPARATUS, DISPLAY SYSTEM, AND CONTROLLING METHOD THEREOF

CROSS-REFERENCE TO RELATED APPLICATIONS

This application claims priority from Korean Patent Application No. 10-2015-0016149, filed in the Korean Intellectual Property Office on Feb. 2, 2015, and U.S. Provisional Application No. 62/032,747, filed on Aug. 4, 2014, the disclosures of which are incorporated herein by reference in their entireties.

BACKGROUND

1. Field

Apparatuses, systems and methods consistent with exemplary embodiments relate to a display apparatus, a display system and a controlling method thereof, and more particularly, to a display apparatus that allocates identification information, a display system and a controlling method thereof.

2. Description of the Related Art

With the development of electronic technologies, various types of electronic products have been developed and distributed. In particular, various display apparatuses, such as televisions (TVs), mobile phones, personal computers (PCs), notebook PCs, and personal digital assistants (PDAs) are now widely used in many households.

As these display apparatuses have become widespread in use, users of the display apparatus require the devices to provide increased capabilities. Accordingly, manufacturers have made efforts to satisfy the increasing requirements of users by introducing products with new capabilities.

As a result, a display apparatus may provide various capabilities. An example of such a capability is the use of a video wall system for displaying a single image using a plurality of display apparatuses arranged together.

However, in order to connect a plurality of display apparatuses, the display apparatuses need to be connected in a certain pattern and then, the connection pattern of the display apparatuses needs to be recognized, which can be inconvenient. Further, there is a need for a technology for allowing each display apparatus to select and display a sub-image out of an image automatically.

Accordingly, there is a need for each display apparatus to be recognized easily and a sub-image to be displayed automatically when a plurality of display apparatuses are connected and used.

SUMMARY

Exemplary embodiments provide to a display apparatus for recognizing each display apparatus easily and displaying a sub-image automatically, a display system, and a controlling method thereof.

According to an aspect of an exemplary embodiment, there is provided a display apparatus including a display, a first communicator configured to communicate with at least one adjacent display apparatus, and a processor configured to allocate identification information corresponding to the display apparatus based on identification information received from the adjacent display apparatus and information on a location relationship of the display relative to the adjacent display apparatus and to display a sub-image of an image on the display based on the allocated identification information.

The display apparatus may further include a second communicator configured to communicate with a source device, and the processor may transmit the allocated identification information to the source device, to receive arrangement information of a plurality of display apparatuses of a video wall system from the source device, and to generate the sub-image by processing an image area of the image corresponding to the allocated identification information based on the received arrangement information and the allocated identification information.

The identification information may include a row identification and a column identification, and the processor may allocate a value for at least one of the row identification and the column identification based on the identification information received from the adjacent display apparatus and the information on the location relationship of the display device relative to the adjacent display apparatus.

The processor may include a value set to at least one of a row identification and a column identification included in the identification information received from the adjacent display apparatus based on the location relationship of the display device relative to the adjacent display apparatus.

According to an aspect of another exemplary embodiment, there is provided a display system including a plurality of display apparatuses, including a plurality of display apparatuses and a source device configured to determine arrangement information of the plurality of display apparatuses based on identification information allocated for each display apparatus, the identification information being received from each of the plurality of display apparatuses, and to transmit the determined arrangement information to each of the plurality of apparatuses, wherein each of the plurality of display apparatuses is configured to display a corresponding sub-image of an image based on the arrangement information and the allocated identification information.

The source device may include a communicator configured to communicate with at least one display apparatus from among the plurality of display apparatuses and a processor configured to transmit a signal for allocating identification information for each display apparatus to a predetermined display apparatus from among the plurality of display apparatuses, to determine arrangement information of the plurality of display apparatuses by receiving identification information allocated for each display apparatus based on the signal for allocating, and to transmit the determined arrangement information to each display apparatus.

Each of the plurality of display apparatuses may include a display, a communicator configured to communicate with at least one of the source device and an adjacent display apparatus, and a processor configured to allocate identification information corresponding to the display apparatus based on identification information of the adjacent display apparatus included in the received signal and information on a location relationship of the display relative to the adjacent display apparatus and to display a sub-image of an image on the display based on the allocated identification information.

The signal for allocating identification information may include a row identification and a column identification, and the value allocated for the row identification and the column identification may correspond to an arrangement location of the plurality of display apparatuses.

The value set to at least one of the row identification and the column identification may increase sequentially according to a connection order of the plurality of display apparatuses.

Each of the plurality of display apparatuses may generate the sub-image by processing an image area of the image corresponding to the allocated identification information based on the received arrangement information and the allocated identification information.

The source device may be integrated with one of the plurality of display apparatuses.

According to an aspect of another exemplary embodiment, there is provided a controlling method of a display apparatus constituting a video wall system, the controlling method including receiving identification information from an adjacent display apparatus, allocating identification information corresponding to the display apparatus based on the received identification information and information on a location relationship of the display apparatus relative to the adjacent display apparatus, and displaying a sub-image of an image based on the allocated identification information.

The controlling method may further include transmitting the allocated identification information to a source device and receiving arrangement information of a plurality of display apparatuses of a video wall system from the source device, and the displaying may include generating the sub-image by processing an image area of the image corresponding to the allocated identification information based on the received arrangement information and the allocated identification information.

The identification information may include a row identification and a column identification, and the allocating identification information may include allocating a value for at least one of the row identification and the column identification based on the identification information received from the adjacent display apparatus and location relation with the adjacent display apparatus.

The allocating identification information may include increasing a value set to at least one of the row identification and the column identification included in identification information received from the adjacent display apparatus based on location relation with the adjacent display apparatus.

According to an aspect of another exemplary embodiment, there is provided a controlling method of a display system including a source device and a plurality of display apparatuses, the controlling method including determining, by the source device, arrangement information of the plurality of display apparatuses based on identification information allocated for each display apparatus, the arrangement information being received from each of the plurality of display apparatuses and transmitting the determined arrangement information to each of the plurality of display apparatuses, and displaying, by the plurality of display apparatuses, a corresponding sub-image of an image based on the arrangement information and the allocated identification information.

The controlling method may further include by the source device, transmitting a signal for allocating the identification information for each display apparatus to a predetermined display apparatus from among the plurality of display apparatuses, and by the plurality of display apparatuses, allocating identification information corresponding to the display apparatus based on information on a location relationship with an adjacent display apparatus included in the received signal.

The signal for allocating identification information may include a row identification and a column identification, and the value set to the row identification and the column identification may correspond to an arrangement location of the plurality of display apparatuses.

The value set to at least one of the row identification and the column identification may increase sequentially according to a connection order of the plurality of display apparatuses.

The controlling method may further include generating the sub-image of the image by processing an image area corresponding to the allocated identification information based on the received arrangement information and the allocated identification information.

BRIEF DESCRIPTION OF THE DRAWINGS

The above and/or other aspects will be more apparent by describing certain exemplary embodiments with reference to the accompanying drawings, in which:

FIG. 5 is a view illustrating identification information according to an exemplary embodiment;

DETAILED DESCRIPTION

Hereinafter, exemplary embodiments will be more explicitly described in detail with reference to the accompanying drawings. In the explanation of the exemplary embodiments, a detailed description related to a well-known structures that may obscures the scope of the disclosure may be omitted.

Figure 1:
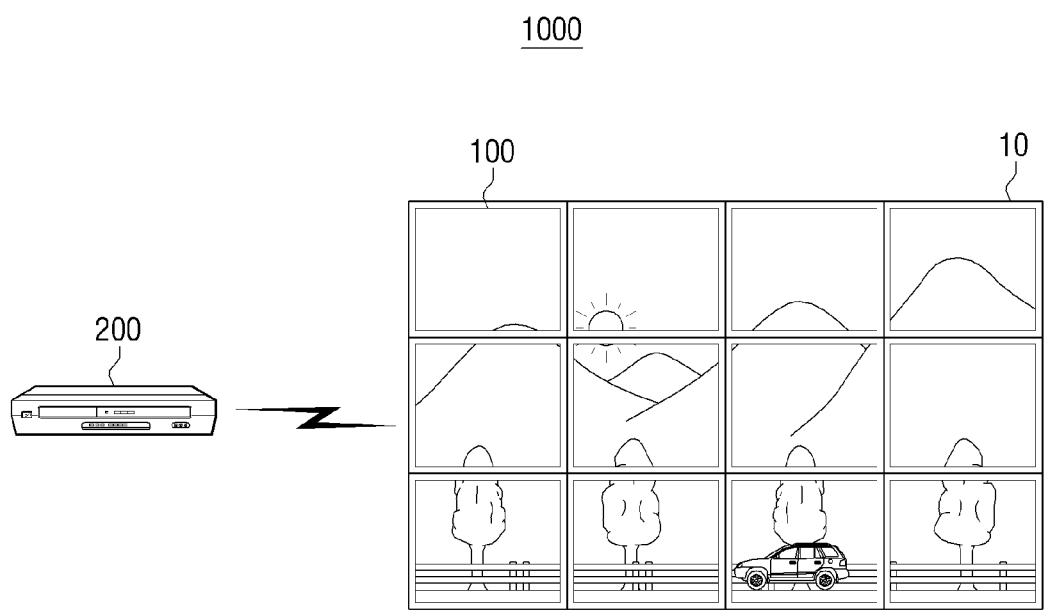
FIG. 1 is a view illustrating an overall system according to an exemplary embodiment.

FIG. 1 is a view illustrating an overall system according to an exemplary embodiment.

Referring to FIG. 1, a display system 1000 includes a large-scale display 10 consisting of a plurality of display apparatuses 100 and a source device 200 configured to transmit image data, a signal for allocating identification information, and arrangement information of each display apparatus to the large-scale display 10.

Here, the large-scale display 10 may be realized as or may refer to a video wall or a video wall system. In addition, a video wall may represent a large screen that is created by arranging a plurality of video screens, where each video screen represents a single sector of the large-scale screen. For example, as illustrated in FIG. 1, a plurality of display apparatuses 100 may constitute the video wall 10, which displays a single image. That is, the single image displayed by the video wall is composed of a plurality of sub-images of the image that are respectively displayed on the individual display apparatuses that comprise the video wall.

A video wall system may be a multi-image processor that receives an image signal from a source device, such as a Video Tape Recorder (VTR) or other device capable of providing an image signal (e.g., a digital versatile disc (DVD) player, a Blu-ray player, a set-top box, etc.), and outputs various images on a large-scale screen, and may control a plurality of screens. Each of the video screens may display part of an image or display the same image repeatedly.

Such a video wall system may be used to realize an electronic display board or a large-scale display for an advertisement or display of any other image, and may enlarge and display an input image without distortion.

The display apparatus 200 and the source device 200 will be described in detail.

Figure 2A:
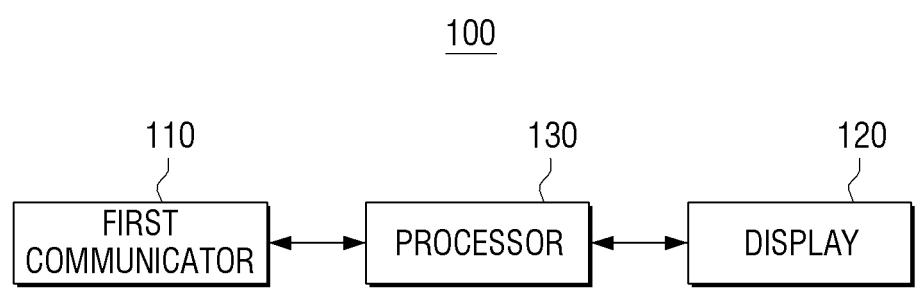
FIG. 2A is a block diagram illustrating a configuration of a display apparatus according to an exemplary embodiment.

FIG. 2A is a block diagram illustrating configuration of a display apparatus according to an exemplary embodiment.

Referring to FIG. 2A, the display apparatus 100 includes a first communicator 110, a display 120 and a processor 130. Here, the display apparatus 100 may be realized as various types of electronic apparatuses such as TV, electronic black board, electronic table, Large Format Display (LFD), smart phone, tablet, desktop PC, notebook PC, etc. Accordingly, the video wall 10 may consist of a plurality of TVs, electronic black boards, LFDs, tablets, etc.

The first communicator 110 may perform communication with at least one adjacent display apparatus. For example, there may be a maximum of four adjacent display apparatuses around the display apparatus 100, and the display apparatus 100 may be connected to at least one of the four adjacent display apparatuses. Accordingly, the first communicator 110 may perform communication with the connected adjacent display apparatus and receive identification information of the connected adjacent display apparatus.

In addition, the display 120 may display various objects, such as a moving image, a still image, a photo, a document, etc., which may be generated as a plurality of images and displayed in a certain frame, such as such as a movie, a drama, a recorded image, a slow video, etc.

To do so, the display 120 may be realized as a Liquid Crystal Display (LCD), an Organic Light Emitting Display (OLED), a Plasma Display Panel (PDP), etc.

The processor 130 may allocate identification information corresponding to the display apparatus 100 based on identification information received from an adjacent display apparatus and the location relation of display apparatus 100 relative to the adjacent display apparatus, and display a sub-image of an image through the display 120 based on the allocated identification information.

The processor 130 may determine identification information allocated for the display apparatus 100 based on the identification information of an adjacent display apparatus, which is received through the first communicator 110, and whether the adjacent display apparatus is connected in a horizontal direction or in a vertical direction relative to the display apparatus 100.

For example, if the received identification information of an adjacent display apparatus is ((1, 1)), and the display apparatus 100 is connected to the adjacent display apparatus in a horizontal direction, (e.g., to the right of the adjacent display apparatus), the processor 130 may add '1' to the column identification of ((1, 1)) and allocate ((1, 2)) as the identification information of the display apparatus 100, which will be displayed in detail later.

In addition, the processor 130 may display a sub-image corresponding to the allocated identification information from among a plurality of sub-images that are generated by dividing an input image by the number of a plurality of display apparatuses constituting the video wall system 10, through the display 120.

In particular, the processor 130 may determine the location of the display apparatus 100 from among a plurality of display apparatuses constituting the video wall system 10 based on the allocated identification information, which will be described in detail with reference to FIG. 2B.

Figure 2B:
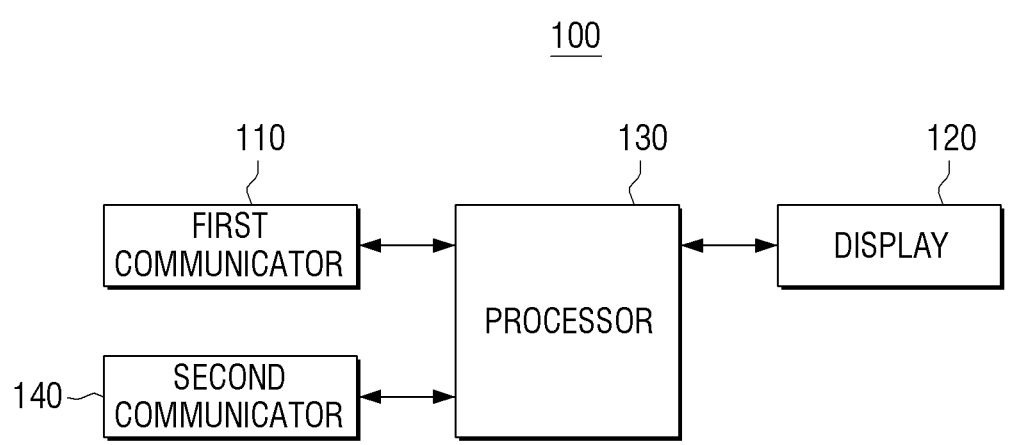
FIG. 2B is a block diagram illustrating a configuration of a display apparatus according to another exemplary embodiment.

FIG. 2B is a block diagram illustrating configuration of a display apparatus according to another exemplary embodiment.

Referring to FIG. 2B, the display apparatus 100 includes the first communicator 110, the display 120, the processor 130, and a second communicator 140. Here, the first communicator 110, the display 120, and the processor 130 have been described previously with reference to FIG. 2A, so description of these elements will not be repeated here.

The second communicator 140 may perform communication with the source device 200. Here, the processor 130 may transmit allocated identification information to the source device 200 through the second communicator 140, and receive arrangement information regarding a plurality of display apparatuses that constitute the video wall system 10 from the source device 200.

Subsequently, the processor 130 may generate a sub-image by processing an image area corresponding to the allocated identification information out of an image based on the received arrangement information and the allocated identification information.

For example, if the processor 130 transmits the allocated identification information ((1, 2)) to the source device 200 through the second communicator 140, and other display apparatuses transmit corresponding identification numbers to the source device 200, respectively, the source device 200 calculates arrangement information based on the received identification information of each device and transmits the calculated arrangement information back to each display apparatus.

Here, the arrangement information refers to information on the number of rows and columns of a plurality of display apparatuses that constitute the video wall system 10. Thus, in an exemplary embodiment in which there are a total of twelve display apparatuses that constitute the video wall system 10 and the plurality of display apparatuses are disposed in a 3×4 arrangement (i.e., the displays are arranged in 3 rows and 4 columns), in which case, the arrangement information is 3×4.

The processor 130 may recognize from the received arrangement information that the plurality of display apparatuses constituting the video wall system 10 are arranged in the 3×4 arrangement and accordingly, the processor 130 may determine an image area corresponding to the allocated identification information out of an image based on the arrangement information and the allocated identification information. For example, the processor may determine an image area from the image that corresponds to a display located at location ((1, 1)), an image area from the image that corresponds to a display located at location ((1, 2)), an image area from the image that corresponds to a display located at (1, 3), and so on.

In addition, the processor 130 may generate a sub-image by processing the determined image area.

In the exemplary embodiment according to FIG. 2B, the first communicator 110 and the second communicator 140 perform communication differently, that is, the first communicator 110 performs communication with an adjacent display apparatus, and the second communicator 140 performs communication with the source device 200. However, the first communicator 110 and the second communicator 140 are not required to be physically distinct, and in other exemplary embodiments a first communication module to perform communication with an adjacent display apparatus and a second communication module to perform communication with the source device 200 may operate such that communication of the first communication module and second communication module is performed through a single communicator.

In the exemplary embodiment of FIG. 2B, the processor 130 generally controls an apparatus, and may be used in combination with a Central Processing Unit (CPU), a microprocessor, a controller, etc. In addition, the processor 130 controls overall operations of an apparatus, and may be realized as System-on-a-chip or System on chip-(SOC or SoC).

Figure 3:
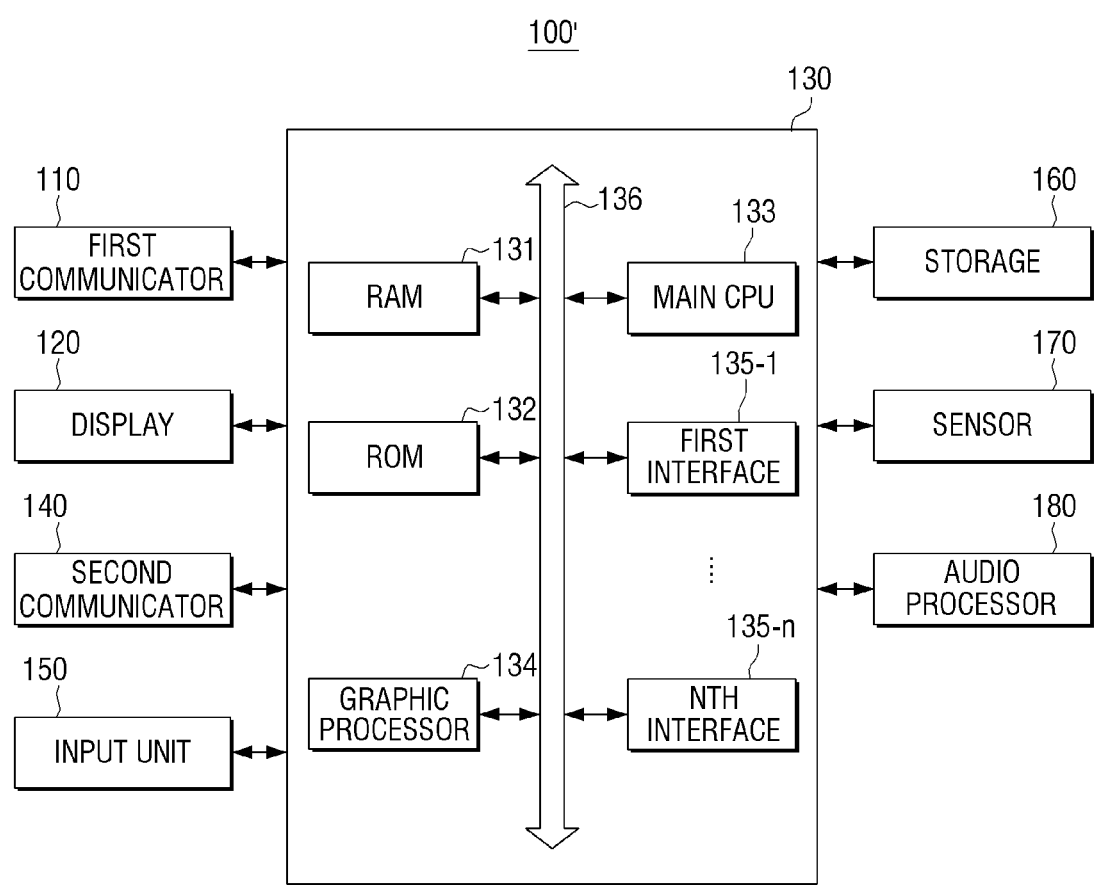
FIG. 3 is a block diagram illustrating a specific configuration of the display apparatus illustrated in FIGS. 2A and 2B according to an exemplary embodiment.

FIG. 3 is a block diagram illustrating a specific configuration of the display apparatus illustrated in FIGS. 2A and 2B according to an exemplary embodiment.

FIG. 3 is a block diagram illustrating specific configuration of the display apparatus illustrated in FIG. 1.

Referring to FIG. 3, a display apparatus 100' includes the first communicator 110, the display 120, the processor 130, the second communicator 140, an input unit 150, a storage 160, a sensor 170, and an audio processor 180. A detailed description regarding the elements of FIG. 3 that overlap with those of FIGS. 2A and 2B has been previously provided and will not be repeated.

The processor 130 controls overall operations of the display apparatus 100'.

Specifically, the processor 130 may include a random access memory (RAM) 131, a read only memory (ROM) 132, a main CPU 133, a graphic processor 134, first to nth interface 135-1~135-n, and a bus 136.

The RAM 131, the ROM 132, the main CPU 133, the graphic processor 134, the first to the nth interface 135-1~135-n, etc. may be interconnected through the bus 136.

The first to the nth interface (135-1 to 135-n) are connected to the above-described various elements. One of the interfaces may be a network interface that is connected to an external apparatus via network.

The main CPU 133 accesses the storage 160, and performs booting using an Operating System (O/S) stored in the storage 160. In addition, the main CPU 133 performs various operations using various programs, contents, data, etc. that are stored in the storage 160.

The ROM 132 stores a set of commands for system booting. If a turn-on command is input and thus, power is supplied, the main CPU 133 copies the O/S stored in the storage 160 to the RAM 131 according to a command stored in the ROM 132, and boots the system by executing the O/S. When booting is completed, the main CPU 133 copies various application programs stored in the storage 160 to the RAM 131, and executes the application programs copied in the RAM 131 to perform various operations.

The graphic processor 134 generates a screen including various objects such as a pointer, an icon, an image, a text, etc. using a computing unit (not shown) and a rendering unit (not shown). The computing unit computes property values such as coordinates, shape, size, and color of each object to be displayed according to the layout of the screen using a control command received from an input unit. The rendering unit generates a screen with various layouts including objects based on the property values computed by the computing unit. The screen generated by the rendering unit is displayed in a display area of the display 120.

The operations of the above-described processor 130 may be performed by a program stored in the storage 160.

The storage 160 may store various data such as an O/S software module to drive the display apparatus 100' and various multimedia contents.

In particular, the storage 160 may include various software modules to allocate identification information corresponding to the display apparatus 100' based on identification information that the processor 130 receives from an adjacent display apparatus and location relation with the adjacent display apparatus and display a sub-image of an image based on the allocated identification information, which will be described in detail with reference to FIG. 4.

The sensor 170 may include various sensors such as a touch sensor to sense touch by a user, a motion sensor to sense a user's motion, etc.

The audio processor 180 may process an audio signal in accordance with a user setting regarding an output range and sound quality of the speaker 110.

Figure 4:
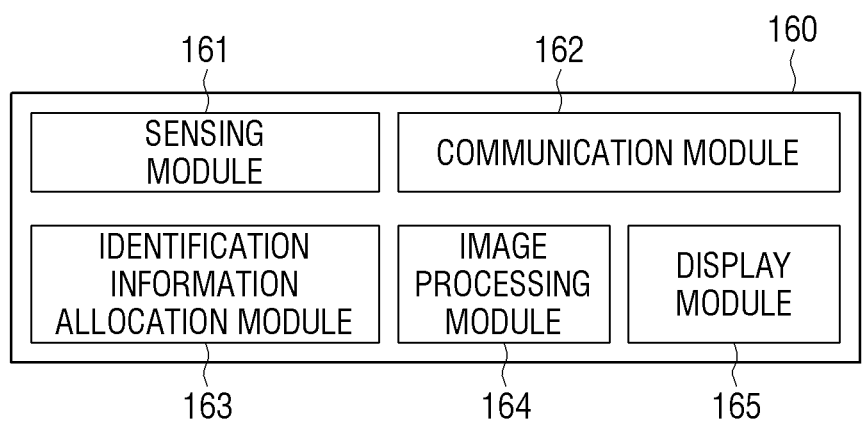
FIG. 4 is a view illustrating a software module stored in a storage according to an exemplary embodiment.

FIG. 4 is a view regarding a software module stored in a storage according to an exemplary embodiment.

Referring to FIG. 4, the storage 160 may store programs such as a sensing module 161, a communication module 162, an identification information allocation module 163, an image processing module 164, a display module 165, etc.

The operations of the above-described processor 130 may be performed by a program stored in the storage 160. Hereinafter, the detailed operations of the processor 130 using a program stored in the storage 160 will be described in detail.

The sensing module 161 collects information from various sensors, and analyzes and manages the collected information. In particular, the sensing module 161 may process a value regarding recognition of an adjacent display apparatus that is connected to the display apparatus 100'. For example, if one of a plurality of output ports of the display apparatus 100' is provided in the side of the display apparatus 100' and another is provided in the lower part of the display apparatus 100', the sensing module 161 may sense whether an adjacent display apparatus is connected to at least one of the first output port in the side of the display apparatus 100' and the second output port in the lower part of the display apparatus 100' and generate and process a value representing the connection state. In addition, the sensing module 161 may set a different value to the connection state of the first output port in the side of the display apparatus 100' and to the connection state of the second output port in the lower part of the display apparatus 100', respectively.

The communication module 162 may receive identification information from an adjacent display apparatus or receive arrangement information regarding a plurality of display apparatuses constituting the video wall system 10 from the source device 200.

The identification information allocation module 163 may perform the operation of allocating identification information corresponding to the display apparatus 100' based on identification information received from an adjacent display apparatus and information on its location in relation to the adjacent display apparatus.

The image processing module 164 may perform the operation of generating a sub-image by processing an image area corresponding to allocated identification information out of an image based on the received arrangement information and the allocated identification information.

The display module 165 may perform the operation of displaying a sub-image of one image through the display 120.

As such, the processor 130 may allocate identification information corresponding to a display apparatus based on identification information received from an adjacent display apparatus and location relation with the adjacent display apparatus using various software modules stored in the storage 160, generate a sub-image by processing an image area corresponding to the allocated identification information out of an image based on the allocated identification information and the arrangement information received from the source device 200, and display the generated sub-image through the display 120.

FIG. 5 is a view illustrating identification information according to an exemplary embodiment.

Referring to FIG. 5, identification information 500 includes a row identification 510 and a column identification 520. For example, the identification information 500 may consist of a total of 7 bits as shown in FIG. 5, and 3 bits out of the 7 bits are used to represent the row identification 510, and the 4 bits are used to represent the column identification 520.

However, in the example of FIG. 5, if a plurality of display apparatuses constituting the video wall system 10 are arranged in a 3×16 arrangement, 2 bits out of the 7 bits may be used to represent the row identification 510 and the 5 bits may be used to represent the column identification 520. In other words, according to the arrangement information of a plurality of display apparatuses constituting the video wall system 10, the number of bits of the row identification 510 and the column identification 520 constituting the identification information 500 may vary. Although the identification information is described in terms of a row identifier followed by a column identifier, this is merely exemplary and in other exemplary embodiments different schemes for identifying and/or addressing individual display apparatuses of the video wall system may be used.

The processor 130 may allocate a value for at least one of the row identification 510 and the column identification 520 based on identification information received from an adjacent display apparatus and relation with the adjacent display apparatus.

Specifically, the processor 130 may increase a value set to at least one of the row identification 510 and the column identification 520 included in identification information received from an adjacent display apparatus based on location relation with the adjacent display apparatus.

For example, if the identification information received from an adjacent display apparatus is ((1, 2)), and the display apparatus 100 is connected to the right side of the adjacent display apparatus, the processor 130 may increase the value set to the column identification 520 by '1'. Accordingly, the identification information allocated for the display apparatus 100 that is connected to the right side of the adjacent display apparatus may become (1, 3).

Alternatively, if the identification information received from an adjacent display apparatus is ((1, 2)), and the display apparatus 100 is connected to the lower part of the adjacent display apparatus (i.e., display apparatus is connected below the adjacent display apparatus), the processor 130 may increase the value set to the row identification 510 by '1'. Accordingly, the identification information allocated for the display apparatus 100 that is connected to the lower part of the adjacent display apparatus may become (2, 2).

In these examples, the value set to the row area 510 and the column area 520 increases by '1', but this is only an example. The increasing value may be changeable, such that other values may be used.

The allocated identification number may be used as an address for communication or image editing between display apparatuses. In addition, in FIG. 5, the value set to the row identification 510 or the column identification 520 is represented in the binary format, but this is only an example. The value may be represented as a different digit format.

The display system 1000 according to an exemplary embodiment includes a plurality of display apparatuses that constitute the video wall system 10 and the source device 200 as illustrated in FIG. 1.

Here, the source device 200 may calculate arrangement information of the plurality of display apparatuses based on identification information allocated for each display apparatus, which is received from each of the plurality of display apparatuses, and transmit the calculated arrangement information to each of the plurality of display apparatuses.

Each of the plurality of display apparatuses may display a corresponding one of the plurality of sub-images of an image based the arrangement information and the allocated identification information.

The source device 200 will be described in detail with reference to FIG. 6.

Figure 6:
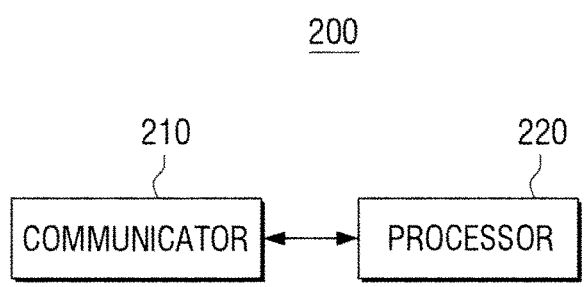
FIG. 6 is a block diagram illustrating configuration of a source device according to an exemplary embodiment.

FIG. 6 is a block diagram illustrating a configuration of a source device according to an exemplary embodiment.

Referring to FIG. 6, the source device 200 includes a communicator 210 and a processor 220. Here, the source device 200 may be realized as a sort of a content providing apparatus, that is, various types of electronic apparatuses such as a broadcast receiving apparatus, a set-top box, etc.

The communicator 210 may perform communication with at least one display apparatus from among a plurality of display apparatuses.

The processor 220 may transmit a signal for allocating identification information for each display apparatus to a predetermined display apparatus from among a plurality of display apparatuses, calculate arrangement information of the plurality of display apparatuses by receiving the identification information allocated for each display apparatus based on the signal, and transmit the calculated arrangement information to each display apparatus.

In addition, each of the display apparatuses may include a display (not illustrated), a communicator that performs communication with at least one of the source device 200 and an adjacent display apparatus, and a processor (not illustrated) that allocates identification information corresponding to a display apparatus based on the identification information of the adjacent display apparatus included in the received signal and location relation with the adjacent display apparatus, and displays a sub-image of an image based on the allocated identification information. The configuration of each of the plurality of apparatuses have been already described above with reference to FIGS. 2A and 2B, so detailed description will not be repeated here. In addition, the configuration of each of the plurality of display apparatuses may correspond to the first communicator 110, the display 120, the processor 130, and the second communicator 140 and accordingly, the configuration can be described with reference to FIGS. 2A and 2B.

The processor 220 of the source device 200 may transmit a signal for allocating identification for each display apparatus to a predetermined display apparatus connected to the source device 200.

The processor 130 of the predetermined display apparatus connected to the source device 200 sets the row identification 510 and the column identification 520 of the received identification information as (0, 0). Subsequently, the processor 130 of the predetermined display apparatus transmits the identification information, which is set to ((0, 0)), to the display apparatus 100 connected to the predetermined display apparatus.

In addition, the display apparatus 100 connected to the predetermined display apparatus may allocate identification information corresponding to the display apparatus 100 based on the identification information of the adjacent display apparatus, which is included in the received identification information (here, the adjacent display apparatus is a predetermined display apparatus, and the identification information is ((0, 0)) and location relation with the adjacent display apparatus.

For example, if the display apparatus 100 is connected to the side of the predetermined display apparatus, the processor 130 of the display apparatus 100 may increase the column identification 520 of the identification information ((0, 0)) received from the predetermined display apparatus from '0' to '1' and allocate the identification information corresponding to the display apparatus 100 as (0, 1).

If the display apparatus 100 is connected to the lower side of the predetermined display apparatus (i.e. below the predetermined display apparatus), the processor 130 of the display apparatus 100 may increase the row area 510 of the identification information ((0, 0)) received from the predetermined display apparatus from '0' to '1' and allocate the identification information corresponding to the display apparatus 100 as (1, 0).

The signal 500 for allocating identification information includes the row identification 510 and the column identification 520, and a value set to the row identification 510 and the column identification 520 may correspond to the arrangement location of the plurality of display apparatuses. In addition, a value set to at least one of the row identification 510 and the column identification 520 may increase sequentially according to the connection order of the plurality of display apparatuses, which have already been described above with reference to FIG. 5, so detailed description will not be repeated here.

After each of the display apparatuses constituting the video wall system 10 allocate identification information and transmit each of the identification information to the source device 200, the source device 200 may calculate arrangement information of the plurality of display apparatuses constituting the video wall system 10 based on the received identification information of each display apparatus.

For example, if the maximum values of the row area 510 and the column area 520 are 2 and 3, respectively (where the starting values of the row and column are respectively 0), the processor 220 of the source device 200 may determine that the plurality of display apparatuses constituting the video wall system 10 are arranged in a 3×4 arrangement (e.g., the display apparatuses are arranged in three rows and four columns) and accordingly, may calculate the arrangement information of 3×4.

Subsequently, the processor 220 of the source device 200 may transmit the calculated arrangement information to each display apparatus.

Each of the plurality of display apparatuses may generate a sub-image by processing an image area corresponding to the allocated identification information out of an image based on the received arrangement information and the allocated identification information.

Figure 7:
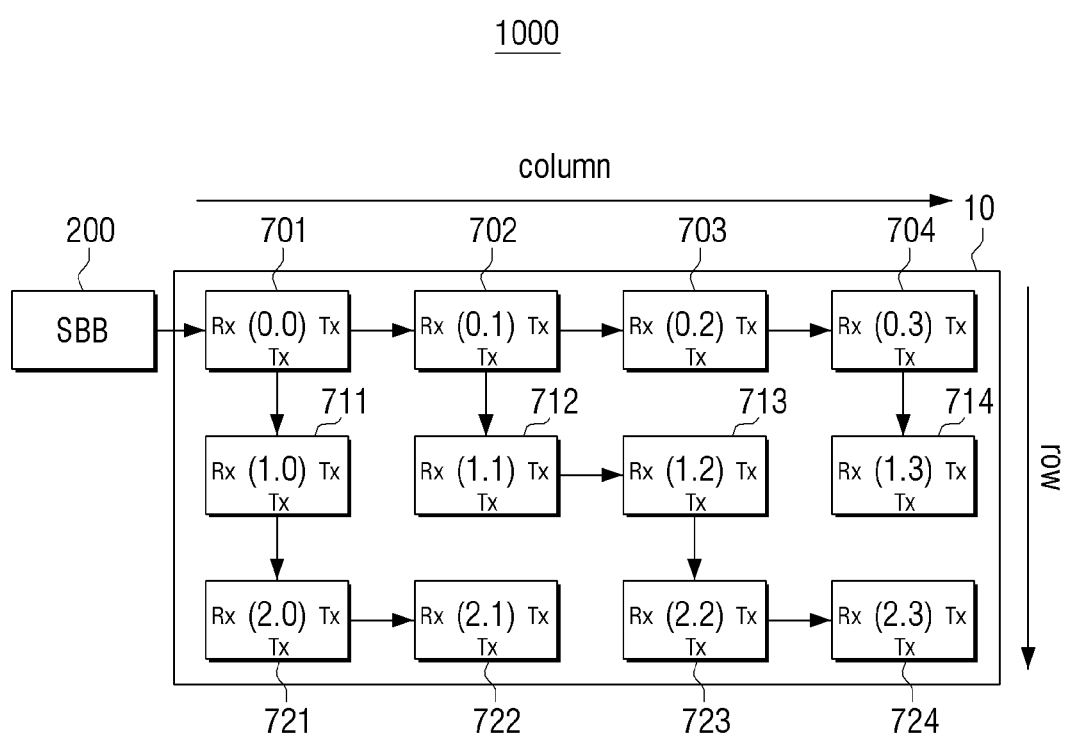
FIGS. 7 to 9 are views illustrating a display system according to exemplary embodiments.
Figure 8:
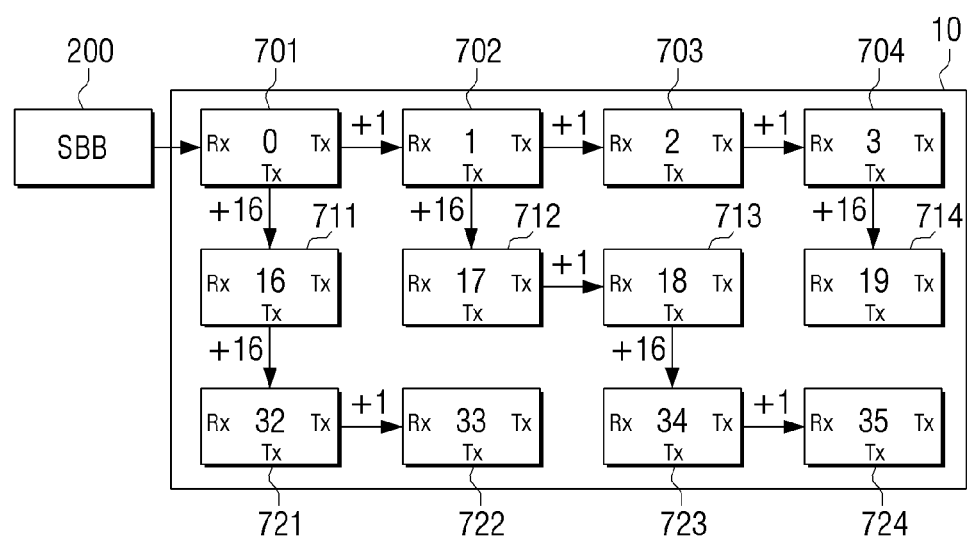
Figure 9:
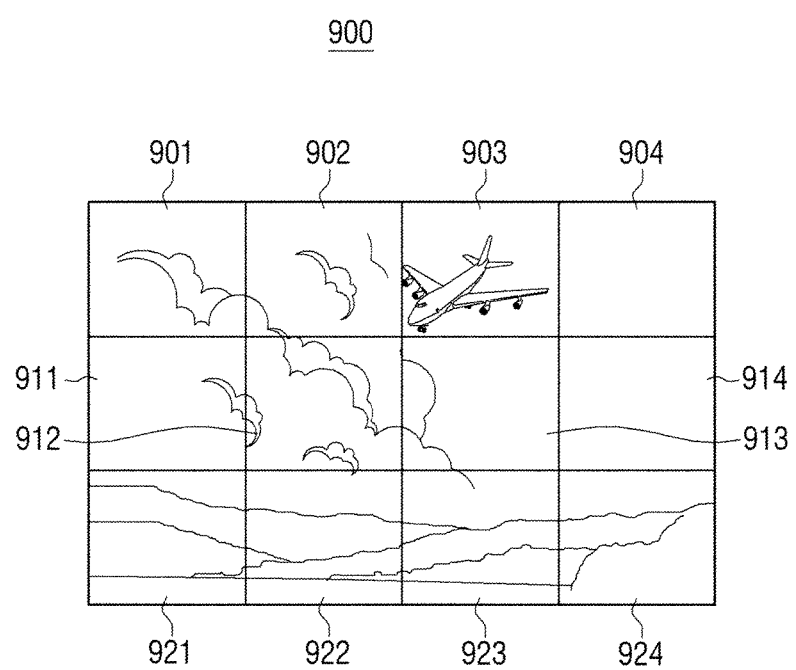

FIGS. 7 to 9 are views illustrating a display system according to exemplary embodiments.

Referring to FIG. 7, the display system 1000 includes the source device 200 (in this exemplary embodiment, the source device 200 is realized as Set-Back BOX (SBB), but other devices may also be used as the source device) and a plurality of display apparatuses 701, 702, 703, 704, 711, 712, 713, 714, 721, 722, 723, 724.

If the source device 200 transmits a signal for allocating identification information to the display apparatus 701, the display apparatus 701 may allocate the value of ((0, 0)) as identification information. Subsequently, the display apparatus 701 may transmit a signal including the identification information of the display apparatus 701 to the display apparatus 702 that is connected at the right side and to the display apparatus 711 which is connected at the lower side.

The display apparatus 702 may increase the value of the column identification 520 of the received identification information of ((0, 0)) and allocate (0, 1) as its identification number.

The display apparatus 711 may increase the value of the row identification 510 of the received identification information of ((0, 0)) and allocate (1, 0) as its identification number.

The display apparatus 721 may increase the value of the row identification 510 of the received identification information of (1, 0) and allocate (2, 0) as its identification number.

Likewise, the display apparatus 722 may increase the value of the column identification 520 of the received identification information of (2, 0) and allocate (2, 1) as its identification number.

Other display apparatuses may also allocate an identification number by increasing a value of at least one of the row identification 510 and the column identification 520 in consideration of the location relationship with an adjacent display apparatus with respect to identification information received from the adjacent display apparatus.

FIG. 7 illustrates that each display apparatus 701, 702, 703, 704, 711, 712, 713, 714, 721, 722, 723, 724 includes one input unit (Rx) and two output units (Tx), but this is only an example. Each display apparatus 701, 702, 703, 704, 711, 712, 713, 714, 721, 722, 723, 724 may include a plurality of input units (Rx) and more than two output units (Tx).

In FIG. 8, the identification number allocated for each display apparatus is displayed in a different digit. Specifically, the identification number allocated for each display apparatus of FIG. 7 is displayed using the binary system in the row identification 510 and the column identification 520 of FIG. 5 and then, this binary number is represented using the decimal system and added.

In other words, there are various methods to represent an identification number, and the method may be determined according to the number of bits of the signal 500 for allocating an identification number.

Each of a plurality of display apparatuses may generate a sub-image by processing an image area of an image corresponding to allocated identification information based on the received arrangement information and the allocated identification information, which will be described with reference to FIG. 9.

FIG. 9 illustrates an image 900 that is provided by the source device 200 to be displayed through the video wall system 10.

Such an image 900 is transmitted to each display apparatus constituting the video wall system 10 from the source device 200, and each display apparatus may display a plurality of sub-images 901, 902, 903, 904, 911, 912, 913, 914 of the image 900 individually based on the arrangement information and the allocated identification information.

For example, as illustrated in FIG. 7, each of the plurality of display apparatuses 701, 702, 703, 704, 711, 712, 713, 714, 721, 722, 723, 724 that constitute the video wall system 10 allocates identification numbers (0,0), (0,1), (0,2), (0,3), (1,0), (1,1), (1,2), (1,3), (2,0), (2,1), (2,2), (2,3), and if the source device 200 calculates arrangement information indicating that the plurality of display apparatuses are arranged in 3×4 arrangement based on the allocated identification numbers of each display apparatus and transmits the arrangement information to each display apparatus, the display apparatus 701 where the identification number of ((0, 0)) is allocated may compare the arrangement information indicating the 3×4 arrangement with its identification number of ((0, 0)), generate the sub-image 901 by processing an image area of the image 900 corresponding to its identification number, and display the generated sub-image 901.

In addition, the display apparatus 702 where the identification number of (0, 1) is allocated may compare the arrangement information indicating the 3×4 arrangement with its identification number of (0, 1), generate the sub-image 902 by processing an image area corresponding to its identification number and display the generated sub-image 902.

Likewise, other display apparatuses 703, 704, 711, 712, 713, 714, 721, 722, 723, 724 may also compare the arrangement information indicating the 3×4 arrangement with their identification numbers, generate the sub-images 903, 904, 911, 912, 913, 914, 921, 922, 923, 924 by processing image areas of the image 900 corresponding to their identification numbers and display the generated sub-images 903, 904, 911, 912, 913, 914, 921, 922, 923, 924.

As described above, each of the plurality of display apparatuses 701, 702, 703, 704, 711, 712, 713, 714, 721, 722, 723, 724 may generate sub-images 901, 902, 903, 904, 911, 912, 913, 914, 921, 922, 923, 924 by processing image areas corresponding to the allocated identification information out of the image 900 based on the received arrangement information and the allocated identification information.

The source device 200 may be realized as one of the plurality of display apparatuses. In other words, the source device 200 may be built in or otherwise incorporated with one of the plurality of display apparatuses and in this case, the display apparatus in which the source device 200 is built may be a main display apparatus, and the remaining display apparatuses may operate as sub-display apparatuses.

For example, the source device 200 may be built in or provided in a display apparatus in the form of a set-top box.

Figure 10:
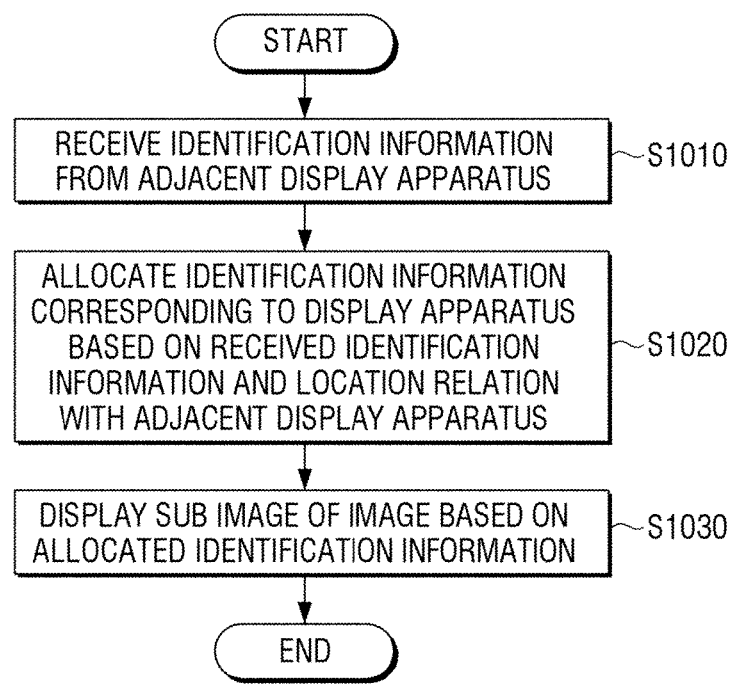
FIG. 10 is a flowchart illustrating a controlling method of a display apparatus which consists of a video wall system according to an exemplary embodiment.

FIG. 10 is a flowchart provided to explain a controlling method of a display apparatus which consists of a video wall system according to an exemplary embodiment.

According to the method illustrated in FIG. 10, identification information is received from an adjacent display apparatus (S1010), and identification information corresponding to a display apparatus may be allocated based on the received identification information and location relation with an adjacent display apparatus (S1020).

Subsequently, a sub-image of an image may be displayed based on the allocated identification information (S1030).

In addition, the controlling method of a display apparatus that constitutes a video wall system according to an exemplary embodiment may further include the operation of transmitting allocated identification information to a source and receiving arrangement information regarding a plurality of display apparatuses that constitute a video wall system from the source device, and the operation of displaying (S1030) may include generating a sub-image by processing an image area corresponding to the allocated identification information out of an image based on the received arrangement information and the allocated identification information.

Here, the identification information includes a row identification and a column identification, and the step of allocating identification information (S1020) may include allocating a value for at least one of the row identification and the column identification based on the identification information received from an adjacent display apparatus and location relation with the adjacent display apparatus.

In addition, the operation of allocating identification information (S1020) may include increasing a value set to at least one of the row identification and the column identification included in the identification information received from an adjacent display apparatus based on a location relationship with the adjacent display apparatus.

Figure 11:
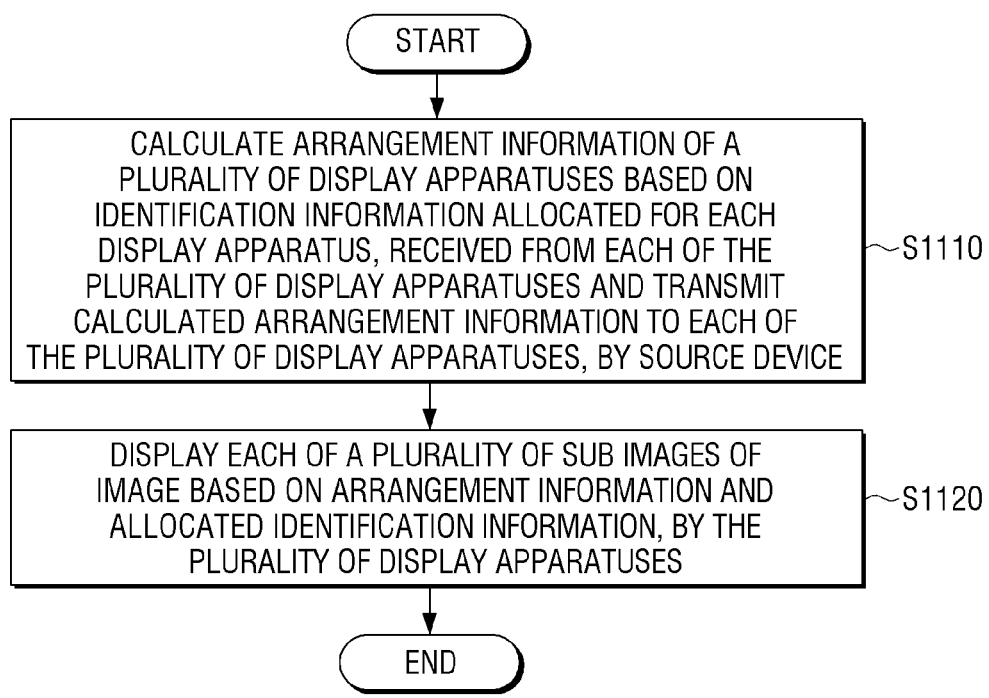
FIG. 11 is a flowchart illustrating a controlling method of a display system including a source device and a plurality of display apparatuses according to an exemplary embodiment.

FIG. 11 is a flowchart provided to explain a controlling method of a display system including a source device and a plurality of display apparatuses according to an exemplary embodiment.

According to the method illustrated in FIG. 11, the source device calculates arrangement information of a plurality of display apparatuses based on identification information allocated for each display apparatus, which is received from each of the plurality of display apparatuses and transmits the calculated arrangement information to each of the plurality of display apparatuses (S1110).

Subsequently, the plurality of display apparatuses display each of a plurality of sub-images of an image based on the arrangement information and the allocated identification information (S1120).

In addition, the controlling method of a display system including a source device and a plurality of display apparatuses according to an exemplary embodiment may further include transmitting a signal for allocating identification information for each display apparatus to a predetermined display apparatus from among the plurality of display apparatuses by the source device and allocating identification information corresponding to a display apparatus based on a relation with an adjacent display apparatus included in the received signal by the plurality of display apparatuses.

Here, the signal for allocating identification information includes a row identification and a column identification, and a value set to the row identification and the column identification corresponds to the arrangement location of the plurality of display apparatuses.

In addition, the value set to at least one of the row identification and the column identification may increase sequentially according to the connection order of the plurality of display apparatuses.

Further, the controlling method of a display system including a source device and a plurality of display apparatuses according to an exemplary embodiment may further include generating a sub-image by processing an image area corresponding to the allocated identification information out of an image based on the received arrangement information and the allocated identification information.

According to one or more of the above-described various exemplary embodiments, when a plurality of display apparatuses are connected and used, each display apparatus may be easily recognized and a sub-image may be displayed automatically.

According to another exemplary embodiment, a non-transitory computer readable medium storing a program which is executable by a processor or computer for performing the controlling method may be provided.

For example, a non-transitory computer readable medium storing a program for performing the operation of allocating identification information corresponding to a display apparatus based on received identification information and location relation with an adjacent display apparatus and the operation of displaying a sub image of an image based on the allocated identification information may be provided.

For example, a non-transitory computer readable medium storing a program for performing the operation of a source device's calculating arrangement information of a plurality of display apparatuses based on identification information allocated for each display apparatus, which is received from each of a plurality of display apparatuses, and the operation of a plurality of display apparatuses' displaying each of a plurality of sub images of an image based on the arrangement information and the allocated identification information may be provided.

The non-transitory recordable medium refers to a medium that may store data semi-permanently rather than storing data for a short time, such as register, cache, memory, etc. and is readable by an apparatus. Specifically, the above-described various applications and programs may be stored and provided in a non-transitory recordable medium such as a compact disc (CD), a digital versatile disc (DVD), a hard disk, a Blu-ray disk, a USB, a memory card, a ROM, etc.

In addition, the block diagrams illustrating a display apparatus and a source device may not illustrate a bus, but communication between each element of the display apparatus and the source device may be performed through a bus. In addition, each device may further include a processor for performing the above-described various operations such as a central processing unit (CPU), a microprocessor, etc.

The foregoing embodiments are merely exemplary and are not to be construed as limiting. The present teaching can be readily applied to other types of apparatuses. Also, the description of the exemplary embodiments is intended to be illustrative and not limiting, and many alternatives, modifications, and variations will be apparent to those skilled in the art.

What is claimed is:
1. A display apparatus comprising:
a display;
a first communicator;
a second communicator; and
a processor configured to:
control the first communicator to communicate with at least one adjacent display apparatus, the adjacent display apparatus displaying a first sub-image of an original image received from a source device,
allocate identification information corresponding to the display apparatus based on identification information received from the adjacent display apparatus and information on a location of the display relative to the adjacent display apparatus,
control the second communicator to transmit the allocated identification information to the source device,
receive arrangement information of a plurality of display apparatuses and the original image from the source device through the second communicator,
obtain a plurality of sub-images of the original image by dividing the original image based on the received arrangement information,
obtain a second sub-image among the plurality of the sub-images based on the allocated identification information, the second sub-image corresponding to the location of the display, and
display the second sub-image of the original image on the display,
wherein the processor allocates the identification information by increasing at least one of a row identification and a column identification included in the received identification information.

2. The display apparatus as claimed in claim 1, wherein the display apparatus and the plurality of display apparatuses constitute a video wall system.

3. A display system comprising:
a plurality of display apparatuses; and
a source device configured to identify arrangement information of the plurality of display apparatuses based on identification information allocated for each display apparatus, the identification information being received from each of the plurality of display apparatuses, and to transmit the identified arrangement information and an original image to each of the plurality of display apparatuses,
wherein each of the plurality of display apparatuses is configured to display a corresponding sub-image of the original image based on the arrangement information and the allocated identification information,
wherein each of the plurality of display apparatuses comprises:
a display;
a communicator; and
a processor configured to:
control the communicator to communicate with at least one adjacent display apparatus,
allocate identification information corresponding to the display apparatus based on identification information received from the adjacent display apparatus and information on a location of the display relative to the adjacent display apparatus,
control the communicator to transmit the allocated identification information to the source device,
receive the arrangement information of the plurality of display apparatuses and the original image from the source device through the communicator,
obtain a plurality of sub-images of the original image by dividing the original image based on the received arrangement information,
obtain the corresponding sub-image of the original image among the plurality of the sub-images based on the allocated identification information, and
display the corresponding sub-image of the original image on the display,
wherein the processor allocates the identification information by increasing at least one of a row identification and a column identification included in the received identification information.

4. The display system as claimed in claim 3, wherein the source device comprises:
a communicator configured to communicate with at least one display apparatus from among the plurality of display apparatuses; and
a processor configured to transmit a signal for allocating identification information for each display apparatus to a predetermined display apparatus from among the plurality of display apparatuses, to identify the arrangement information of the plurality of display apparatuses by receiving identification information allocated for each display apparatus based on the signal for allocating, and to transmit the identified arrangement information to each display apparatus.

5. The display system as claimed in claim 3, wherein the row identification and the column identification correspond to an arrangement location of the plurality of display apparatuses.

6. The display system as claimed in claim 3, wherein the source device is integrated with one of the plurality of display apparatuses.

7. A controlling method of a display apparatus, the controlling method comprising:
  receiving identification information from an adjacent display apparatus, the adjacent display apparatus displaying a first sub-image of an original image received from a source device;
  allocating identification information corresponding to the display apparatus based on the received identification information and information on a location relationship of the display apparatus relative to the adjacent display apparatus;
  transmitting the allocated identification information to the source device;
  receiving arrangement information of a plurality of display apparatuses and the original image from the source device;
  obtaining a plurality of sub-images of the original image by dividing the original image based on the received arrangement information;
  obtaining a second sub-image among the plurality of the sub-images based on the allocated identification information, the second sub-image corresponding to a location of the display; and
  displaying the second sub-image of the original image,
  wherein the allocating the identification information comprises increasing at least one of a row identification and a column identification included in the received identification information.

8. The controlling method as claimed in claim 7, further comprising:
  receiving arrangement information of a plurality of display apparatuses from the source device, the display apparatus and the plurality of display apparatuses constituting a video wall system,
  wherein the displaying comprises generating the second sub-image by processing an image area of the original image corresponding to the allocated identification information based on the received arrangement information and the allocated identification information.

9. A controlling method of a display system including a source device and a plurality of display apparatuses, the controlling method comprising:
  identifying, by the source device, arrangement information of the plurality of display apparatuses based on identification information allocated for each display apparatus, the identification information being received from each of the plurality of display apparatuses, and transmitting the identified arrangement information and an original image to each of the plurality of display apparatuses;
  allocating, by each of the plurality of display apparatuses, identification information corresponding to the display apparatus based on identification information received from an adjacent display apparatus and information on a location relationship with the adjacent display apparatus;
  transmitting, by each of the plurality of display apparatuses, the allocated identification information to the source device;
  receiving, by each of the plurality of display apparatuses, arrangement information of the plurality of display apparatuses and an image from the source device;
  obtaining, by each of the plurality of display apparatuses, a plurality of sub-images of the original image by dividing the original image based on the received arrangement information;
  obtaining, by each of the plurality of display apparatuses, a corresponding sub-image of the original image among the plurality of the sub-images based on the allocated identification information; and
  displaying, by each of the plurality of display apparatuses, the corresponding sub-image of the original image,
  wherein the allocating the identification information comprises increasing at least one of a row identification and a column identification included in the received identification information.

10. The controlling method as claimed in claim 9, further comprising:
  by the source device, transmitting a signal for allocating the identification information for each display apparatus to a predetermined display apparatus from among the plurality of display apparatuses.

11. The controlling method as claimed in claim 9, wherein the row identification and the column identification correspond to an arrangement location of the plurality of display apparatuses.

* * * * *